Figure 1:
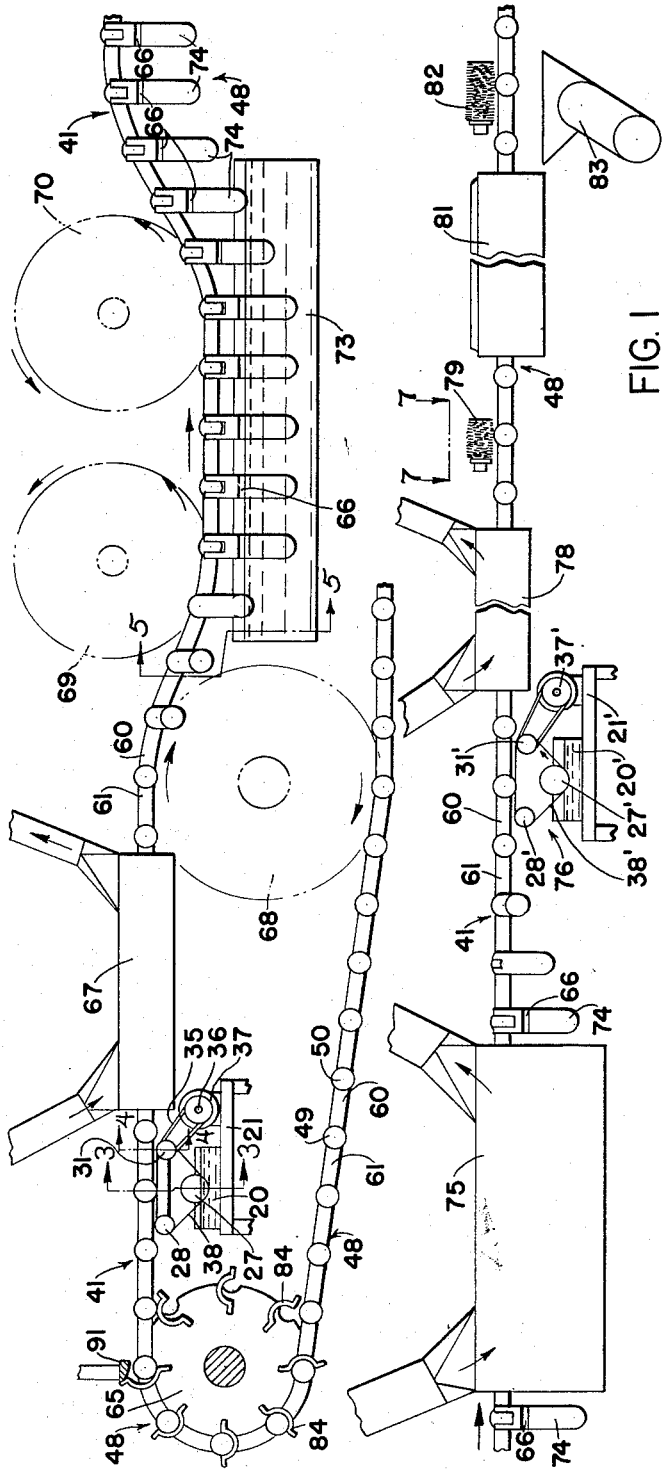

June 28, 1955

J. F. EMERY 2,711,737

FORMING BEADS ON NON-TACKY MATERIAL
AND ARTICLES PRODUCED THEREBY

Filed May 29, 1952

6 Sheets-Sheet 1

INVENTOR.
JOHN F. EMERY

BY Ely, Frye & Hamilton

ATTORNEYS

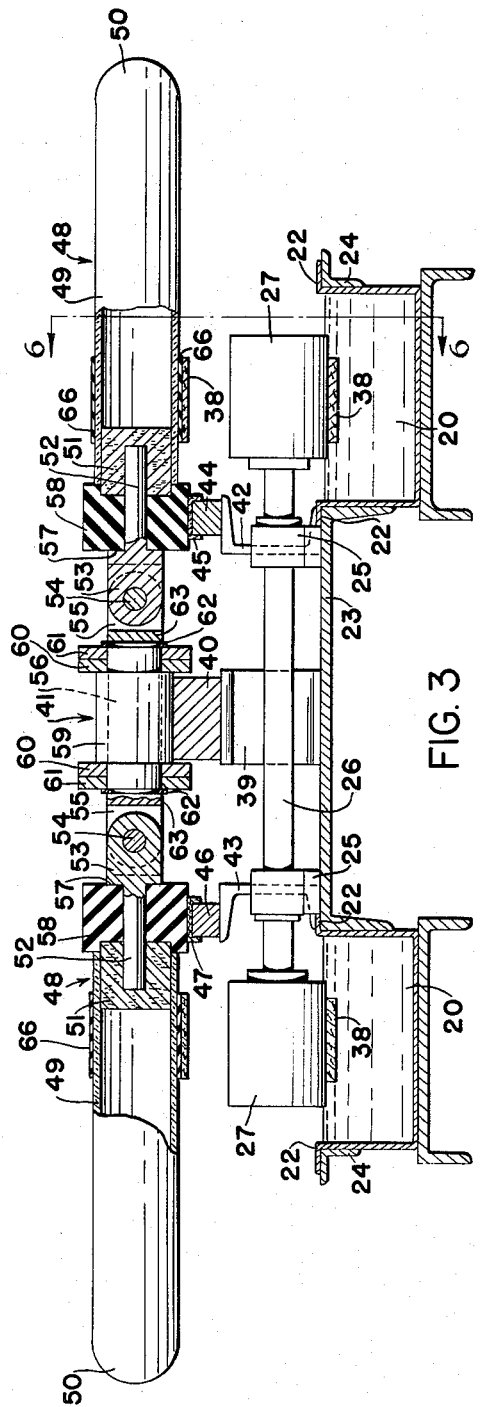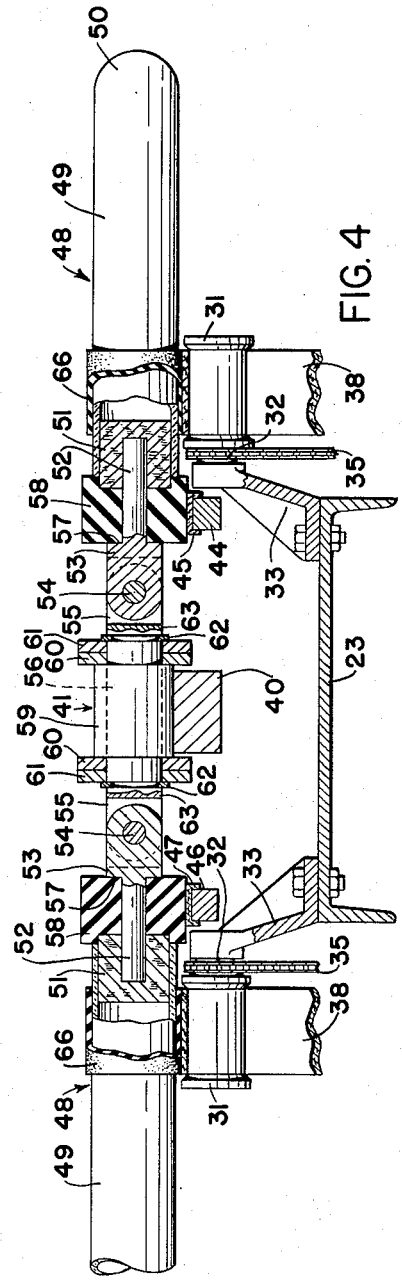

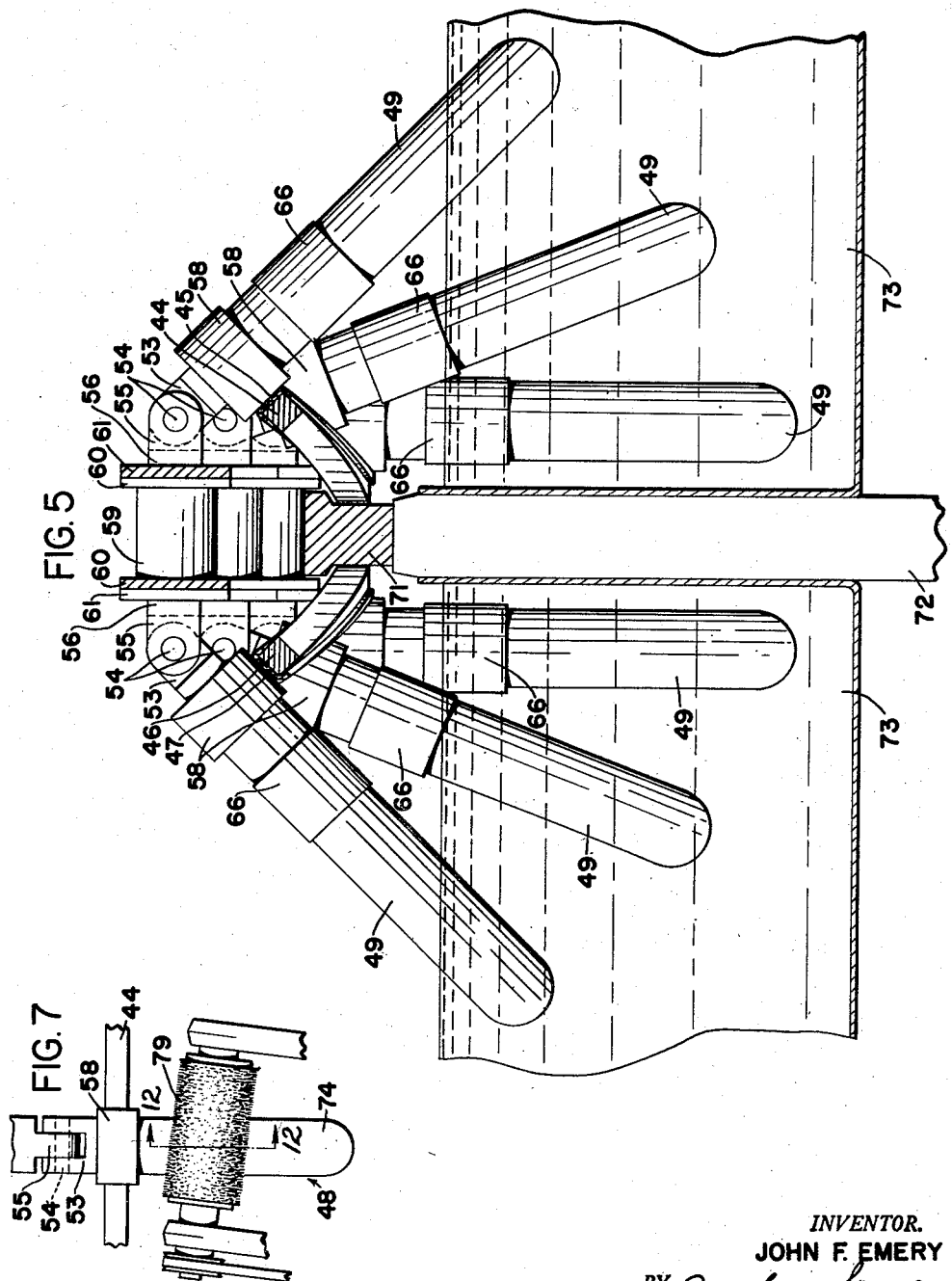

June 28, 1955
J. F. EMERY
2,711,737
FORMING BEADS ON NON-TACKY MATERIAL
AND ARTICLES PRODUCED THEREBY
Filed May 29, 1952
6 Sheets-Sheet 4

INVENTOR.
JOHN F. EMERY
BY
ATTORNEYS

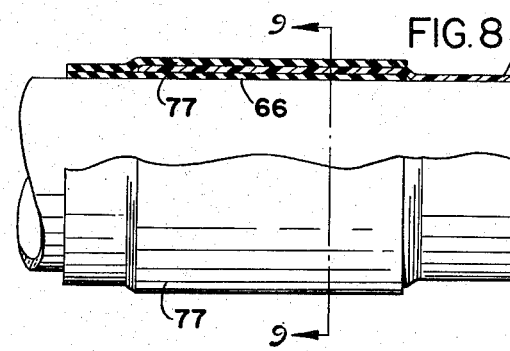
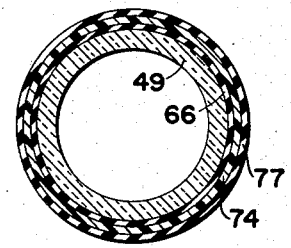
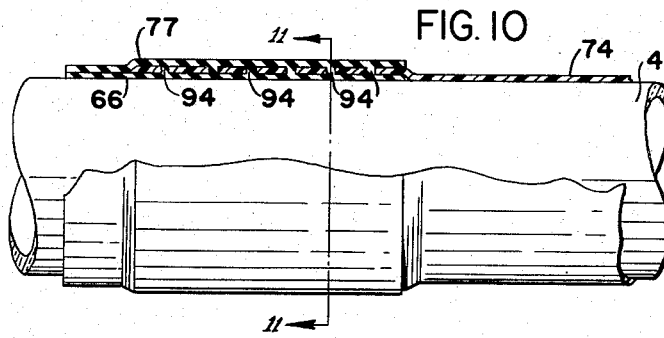
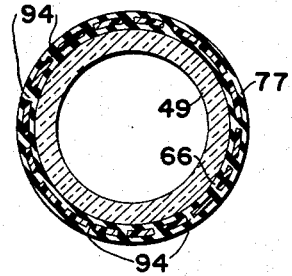
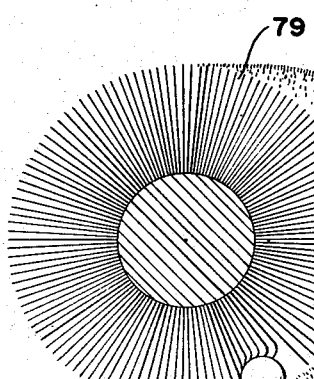

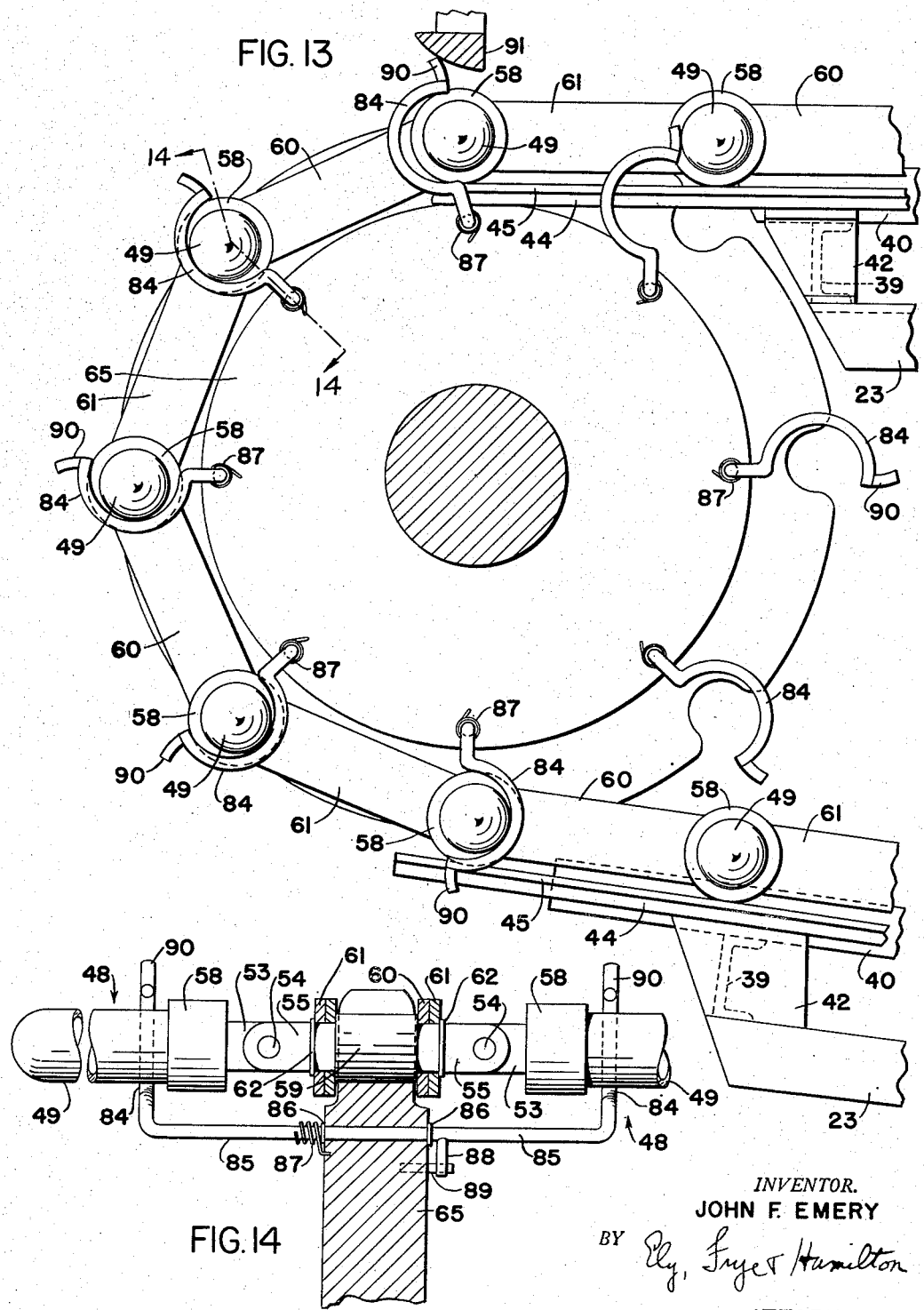

United States Patent Office 2,711,737
Patented June 28, 1955

2,711,737

FORMING BEADS ON NON-TACKY MATERIAL AND ARTICLES PRODUCED THEREBY

John F. Emery, Boston, Ohio, assignor to Serugo Rubber Co., Akron, Ohio, a corporation of Ohio Application May 29, 1952, Serial No. 290,664

16 Claims. (Cl. 128—294)

This invention relates to a novel method for providing beads on articles made from materials which are non-tacky and consequently cannot adhere to themselves when an attempt is made to roll a reinforcing bead thereon in the manner now used with articles made from tacky material such as latex or equivalent material. It also relates to the articles produced by the method.

In the manufacture of relatively thin articles such as are made from liquid latex or equivalent tacky material, for example, thin rubber gloves, finger cots, toy rubber balloons, prophylactics, and other articles, it is necessary to reinforce the edges of the articles against tearing and undue stretching, and this has been readily accomplished by rolling the material upon itself, while still in a tacky condition, from the edge inwardly to thereby form a reinforcing bead on the article which becomes a permanent part of the article after vulcanization.

In recent years, however, groups of plastic materials have come into existence which are suitable for forming the articles mentioned and other articles requiring a thin flexible film, except that after a mold has been dipped into a dispersion of these plastic materials, such materials after drying, are not sufficiently tacky to permit a bead to be rolled thereon in the manner customarily used with latex and other tacky materials. Examples of these plastic materials that are non-tacky after drying on a mold or form are organosols and plastisols, which are dispersions essentially of vinyl resins, and dispersions of nylon would also be representative of the type of plastic material that is non-tacky after drying on a mold or form.

One of the objects of this invention is to provide a method of making relatively thin articles of the type previously referred to from plastic non-tacky materials, which method enables a reinforcing bead to be rolled on the open end of such articles.

Another object is to provide a method for forming beads on the open end of such articles made of non-tacky material, which method includes enclosing a portion of the article from its open end inwardly with inner and outer sleeves of tacky material, and thereafter rolling said sleeves and the enclosed portion of the article inwardly upon themselves to form a bead on the article, which bead retains its formation due to the tackiness of the sleeves that become a permanent part of the bead.

A further object is to provide a method for forming beads on the open end of articles of the type referred to made of non-tacky material, which includes forming on a molding form, a sleeve of material which becomes tacky after drying, then dipping the form into a dispersion of non-tacky material so that the upper end of the latter material terminates intermediate the ends of the tacky sleeve, then forming a second sleeve of tacky material co-extensive with the first sleeve so that a portion of the non-tacky material is confined between the two sleeves, then rolling said sleeves and the confined portion of the non-tacky article upon themselves to form a bead on the article, and thereafter curing the article with the bead formed thereon and removing the cured article from the molding form.

A further object is to provide an alternate method wherein the portion of the non-tacky article enclosed between the sleeves is provided with a plurality of perforations or openings therein so that as the second sleeve is formed over the article the material of the second sleeve will pass through these perforations and become joined to the first sleeve, to thereby firmly hold the enclosed portion of the article between the sleeves while the bead is thereafter being rolled.

A further object is to provide articles of the type referred to formed of non-tacky material and having reinforcing beads rolled thereon by utilizing inner and outer sleeves of tacky material which confine a portion of the article, with the material of the sleeves becoming a permanent part of the article.

A further object is to provide by way of example, one form of apparatus that may be used in carrying out the invention, which in this instance is of twin or duplex construction, but it will be apparent that other forms of apparatus may be utilized, and in fact the method can be carried out by hand.

Other objects and advantages will become apparent from the following description taken in conjunction with the accompanying drawings.

Figure 2:
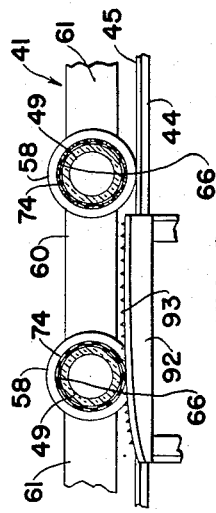
Figure 6:
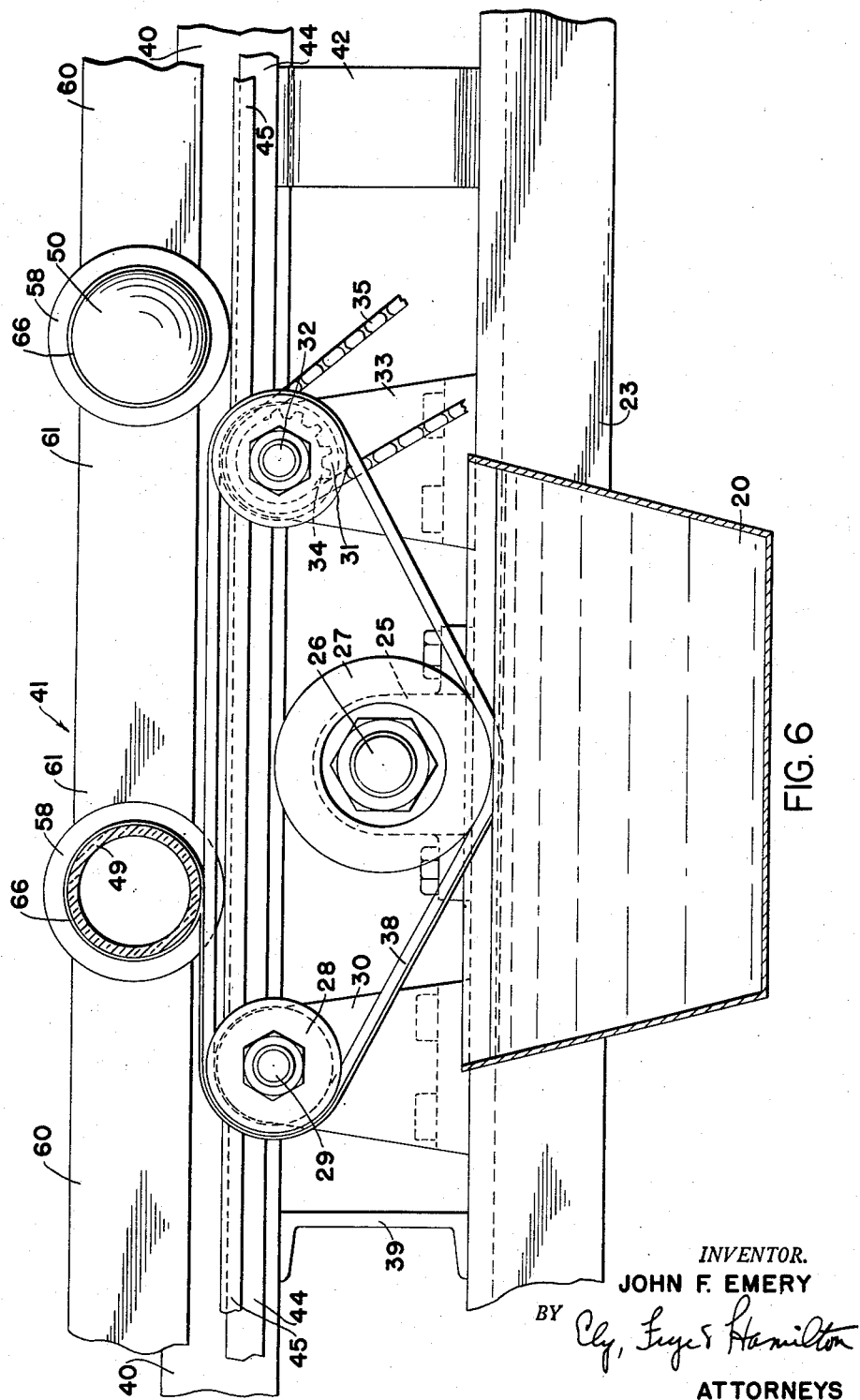

In the drawings:

Fig. 1 is a more or less diagrammatic side elevation of one form of apparatus that can be utilized in carrying out the method, which figure is shown in two portions due to the lack of space, Fig. 2 is an enlarged fragmentary view of an additional piece of equipment that would be used when the alternate method involving perforating a portion of the article is practiced, Fig. 3 is an enlarged sectional view with some parts being shown in elevation, taken substantially on line 3—3 of Fig. 1, Fig. 4 is a similar view taken substantially on line 4—4 of Fig. 1, Fig. 5 is a similar view taken substantially on line 5—5 of Fig. 1, Fig. 6 is a further enlarged fragmentary view taken substantially on line 6—6 of Fig. 3, Fig. 7 is a plan view of a portion of the apparatus taken substantially in the direction indicated by line 7—7 of Fig. 1, Fig. 8 is an enlarged fragmentary view showing the inner and outer sleeves enclosing a portion of the article on which a bead it to be rolled, Fig. 9 is a section taken substantially on line 9—9 of Fig. 8, Fig. 10 is a view similar to Fig. 8 showing the inner and outer sleeves confining a portion of the article which has been perforated so that the sleeves are joined through the perforations, Fig. 11 is a section taken substantially on line 11—11 of Fig. 10, Fig. 12 is an enlarged fragmentary view taken substantially on line 12—12 of Fig. 7, Fig. 13 is an enlarged fragmentary view showing the means for holding the molding forms in horizontal position as the chain conveyor finishes its lower run, and Fig. 14 is a section taken substantially on line 14—14 of Fig. 13.

Referring to the drawings, a twin or duplex apparatus is shown with two sets of molding forms being carried on opposite sides of a chain conveyor, and with a series of tanks containing the various dispersions to be received on the molding forms, one series for each set of such forms.

Referring to Figs. 1 and 3, the numeral 20 designates a pair of spaced tanks containing a bath of liquid latex or equivalent material. This material of the baths may be in its natural condition, or concentrated or thickened and/or admixed with compounding, vulcanizing, activating, accelerating and/or preservative ingredients. The tanks 20 may be carried on suitable supports 21 and may have flanges 22 which are receive on a main horizontal supporting beam 23 and on side beams 24.

Mounted laterally of the tanks 20, in spaced bearing brackets 25 carried on beam 23, is a freely rotatable shaft 26 that carries on each end thereof a relatively large roller 27 fixed on the shaft in a position to be partially submerged in one of the baths 20. To the left of and slightly higher than rollers 27 (as viewed in Figs. 1 and 6), a pair of smaller, flanged, idler rollers 28 are suitably mounted for rotation with a pair of shafts 29 carried on bearing brackets 30 secured to beam 23. To the right of rollers 27, in the same horizontal plane as rollers 28, a pair of driven, flanged rollers 31 (see Fig. 4 also) are mounted, which latter rollers are of the same size and shape as rollers 28. Rollers 31 are fixed on a pair of driven shafts 32 which are mounted for rotation in bearing brackets 33.

A sprocket 34 is fixed on each shaft 33 near its inner end, and each sprocket receives a drive chain 35 that also passes around a drive sprocket (not shown) fixed on a drive shaft 36 which is driven by a suitable electric motor 37 fixed on one of the supports 21. Separate motors 37 may be used for each chain 35, or a single motor could be used by extending the shaft 36 to receive both drive sprockets, as will be understood.

Passing over each set of rollers 28 and 31, between the flanges thereof, and under rollers 27, is a felt covered or felt composition belt 38 which is driven in a counter-clockwise direction (as viewed in Figs. 1 and 6) by motor 37, the arrangement being such that each belt 38 passes through one of the baths 20 and picks up the latex material on its outer surface from which it is later transferred. The upper run of the belts between rollers 31 and 28 preferably should be substantially horizontal, and if it is found that the belts sag too much during this run, the spacing of the rollers may be changed in any conventional manner, or a shelf or other suitable support (not shown) may be utilized to hold this run of the belts in horizontal position.

The main supporting beam 23 carries centrally thereof a plurality of spaced vertical supporting brackets 39 (Figs. 3 and 6) that support a longitudinally extending guide bar 40 which serves as a guide for an endless chain conveyor, indicated as a whole by the numeral 41, which conveyor carries on each side thereof a plurality of molding forms to which liquid latex is to be transferred from the belts 38, as will be later explained.

On opposite sides of brackets 39, beam 23 also carries two rows of spaced vertical supporting brackets 42 and 43. Brackets 42 have welded or otherwise secured thereto, a longitudinally extending track 44 having a rubber covered upper surface 45, while brackets 43 similarly have secured thereto, a longitudinal track 46 having a rubber covered upper surface 47. As indicated in Fig. 13, the tracks 44 and 46 extend beyond the front end of beam 23, in position to receive the molding forms in horizontal position, as will be explained.

Fig. 3 shows in detail two of the molding forms, one on each side of the conveyor 41, which are designated as a whole by the numeral 48, it being understood that all of the forms are identical in construction, and since, in this instance, the products being manufactured may be finger cots or prophylactics, the molding forms are substantialy cylindrical. Each molding form comprises a hollow cylindrical body portion 49 of glass, porcelain or other suitable material, permanently closed at its outer end which preferably is rounded, as indicated at 50, while the opposite end tightly receives a plug 51 formed of cork or rubber. Although the body 49 fits tightly over the plug 51, it may be pulled off the plug in the event of breakage of the body portion and replaced with another body portion.

Suitably secured in the plug 51 is one end of an annular shank 52 formed integral with a bifurcated (Fig. 7) metal end piece 53 which is pivoted by a pivot pin 54 to the extended end portion 55 of a short shaft 56. Also suitably secured to shank 52 and between a shoulder 57 formed on end piece 53 and the outer end of plug 51, is a relatively large rubber collar 58, the purpose of which is to frictionally engage the rubber surface of tracks 44 or 46 and rotate the molding forms when such rotation is required.

As will be observed from Fig. 3, each shaft 56 is common to two of the molding forms which extend from opposite sides thereof. Shaft 56 passes through a tubular spacer 59 which is arranged between inner links 60 of the chain conveyor 41 and is adapted to rest on guide bar 40 during its horizontal movement through that portion of the apparatus in which the guide bar 40 is utilized. Outer links 61 of the chain conveyor contact the inner links and the lower portion of all the links extend below the upper surface of guide bar 40. Adjacent each outer link 61, a split holding ring 62 extends partially into a groove 63 formed on shaft 56 and holds the links against lateral displacement without interfering with rotation of the shaft 56 and the molding forms carried thereby. Thus, each shaft 56 takes the place of the conventional link pins in the chain conveyor.

As will be understood, the chain conveyor 41 is continuous, being made up of a plurality of inner and outer links 60 and 61, connected by one of the shafts 56. All of the operations which are performed during the travel of the conveyor take place during the upper run thereof, and since there is insufficient room on the drawings to illustrate all of the operations in a continuous line, Fig. 1 has been broken into two parts, and the drive sprocket for the chain conveyor has been omitted. However, since such sprockets are well known in this art, it is believed its function will be readily understood. Such a drive sprocket would be located at the right end of the conveyor as viewed in Fig. 1, while at the left end, the chain passes around an idler sprocket 65 in the usual manner, with the movement of the conveyor being in a clockwise direction.

As the conveyor chain leaves the sprocket 65, the molding forms 48 are in horizontal position as indicated in Figs. 3 and 4, such horizontal position having been maintained during travel around sprocket 65, as will be explained, and the molding forms are rotated along with shaft 56 by frictional engagement of rubber collars 58 with the tracks 44 and 46, while the links of the chain are guided on bar 40. Beam 23 and bar 40 begin at this point in the apparatus, but tracks 44 and 46 extend beyond the forward end of beam 23 so that the molding forms are maintained in horizontal position as they leave the sprocket 65.

As the conveyor continues to move, an intermediate portion of the outer surface of each molding form on each side of the chain is brought into engagement with the outer surface of one of the endless belts 38 during the upper run of the latter after they have passed through the baths 20. Preferably these belts 38 travel at approximately the same surface speed as the peripheral speed of the molding forms, and the liquid latex or equivalent material is transferred from the belts to the molding forms to form a sleeve 66 on each of the latter. The thickness of these sleeves 66 may be controlled by the length of the upper run of the belts 38 and by the number of revolutions each molding form makes while in contact with the belts. The showing in the drawings is, of course, by way of example only, and may be changed as desired.

The rotating molding forms with the sleeves 66 thereon now pass through a conventional dryer 67 which leaves the sleeves in tacky condition. In order now to deposit a coating or film of non-tacky material over the molding forms and partially over the sleeves 66, it becomes necessary to pivot the molding forms from their horizontal to a vertical position. To accomplish this, the beam 23 and guide bar 40 are terminated near the rear end of the dryer 67 so that the conveyor chain may pass over an idler sprocket 68, then downwardly and under a pair of idler sprockets 69 and 70, by which latter sprockets the chain is forced to move in a substantially horizontal path, but at a lower level, as indicated in Fig. 1. During this change in the operating level of the conveyor chain, the tracks 44 and 46 continue from the end of beam 23, and are curved downwardly to coincide with the arc taken by the chain and inwardly to become suitably secured to the sides of a T-shaped guide bar 71 (Fig. 5) which in turn is suitably supported on spaced vertical supports 72. The first vertical support 72 is located adjacent the front end of a pair of spaced relatively long suitably supported tanks 73 and as many additional supports 72 may be used as are necessary to support the guide bar 71 with the chain in engagement therewith during its passage on the lower level.

As indicated in Figs. 1 and 5, the curvature of the tracks 44 and 46 from beam 23 to guide bar 71 is such that the molding forms 49 progressively and successively pivot downwardly by gravity about pivot pins 54 until they reach a vertical position, in which position the molding forms on each side of the conveyor chain pass through one of the tanks 73. The tanks 73 contain dispersions of a plastic material that is non-tacky after drying. For example, these could be dispersions of organosols, or plastisols, or nylon. Figs. 1 and 5 show the approximate level of the non-tacky plastic material with respect to the vertical molding forms, and it will be observed that a coating or film 74 of the plastic material will be deposited on each molding form from the bottom thereof to a point intermediate the ends of sleeves 66. The thickness of the coating or film 74 may be controlled by varying the distance the molding forms travel through tanks 73. Although the material in the tanks 73 is non-tacky after drying, it will readily adhere to the molding forms and to that portion of sleeves 66 which is covered thereby. It should also be noted from Fig. 5 that as soon as the molding forms 49 begin to pivot downwardly, their angles with respect to the horizontal shafts 56 makes it impossible to continue rotation of the molding forms, and the collars 58 will merely slide over the tracks 44 and 46. However, it is not necesary to rotate the molding forms during their passage through the tanks 73.

After leaving its lower level near the rear end of tanks 73, the conveyor chain is directed upwardly to approximately its original level, and with the molding forms remaining in vertical position it passes through a conventional dryer 75 of sufficient length to satisfactorily dry the coating or film 74 on each form. To bring the chain from the lower level to the upper level of its run, the guide bar 71 is suitably curved upwardly and maintained properly secured to spaced vertical supports, such as the supports 72, which supports may vary in length until the upper level is reached. During the time the molding forms are maintained in vertical position, the tracks 44 and 46 remain secured to the sides of guide bar 71 and serve to help retain the molding forms in vertical position.

The guide bar 71 continues to a point near the front end of a second sleeve applying unit, indicated as a whole by the numeral 76, at which point the main supporting beam 23 starts again and continues for the remainder of the upper run of the conveyor, with brackets 39 thereon supporting guide bar 40, so that the conveyor chain may readily pass from guide bar 71 to guide bar 40. The brackets 42 and 43 for supporting tracks 44 and 46 also start again with beam 23. In order to apply a second sleeve to the molding forms it is necessary to raise these forms from their vertical to horizontal positions. Hence, near the rear end of the dryer 75, the tracks 44 and 46 curve upwardly and outwardly until they pass over and are supported by the brackets 42 and 43 which are again maintained in their relative spaced relation indicated in Fig. 3. The curving of the tracks 44 and 46 is substantially the reverse of the curves indicated in Fig. 5, and the tracks act as cams to progressively and successively pivot the molding forms upwardly to horizontal position, as will be understood. As soon as each pair of molding forms reaches vertical position the friction drive between tracks 44 and 46 and the rubber collars 58 will again rotate the forms and the shaft 56 connecting them.

The second sleeve applying unit 76 is identical in all respects to the first sleeve applying unit and it will be understood that the parts of this second unit which are designated with primed numerals are similar to their unprimed counterparts in the first unit. Thus, the tanks 20' which are mounted on a suitable support 21' contain the same liquid latex or equivalent material as the tanks 20, while belts 38' travel counterclockwise (as viewed in Fig. 1) around rollers 27', 28' and 31', and the belts are driven by motors 37'. The belts 38' pass through the baths 20' picking up the liquid latex, and during their upper runs this liquid is transferred from the belts to the molding forms to form sleeves 77 thereon (Fig. 8) that are substantially co-extensive with the sleeves 66 which are already on the forms. As will be seen from Fig. 8, a substantial portion of the inner end or neck of the film coating 74 is received and held between the sleeves 66 and 77, while the latter extend beyond the end of coating 74.

After receiving the sleeves 77, the molding forms continue their travel in horizontal position and pass through a conventional dryer 78, which operation, however, still leaves the sleeves 66 and 77 sufficiently tacky so that they may be rolled upon themselves to form beads.

The molding forms next pass under a pair of conventional angularly arranged rotating brushes 79, one of which is shown in Figs. 1, 7 and 12, which rolls the inner ends of sleeves 66 and 77 upon themselves to form a bead 80 (Fig. 12) on each molding form, which bead necessarily includes the portion of film 74 that is enclosed by the sleeves 66 and 77. The size of these beads may be controlled by the length of brushes 79, and it will be apparent that the tackiness of the sleeves 66 and 77 permits the formation of a bead on film 74, which it would otherwise be impossible to form because of the non-tacky condition of the film 74 after drying.

After the beads 80 have been rolled on the molding forms, the latter pass through a conventional curing oven 81, in which the final product, consisting of a body portion of non-tacky plastic material having a bead thereon formed with the two sleeves of tacky material and part of the non-tacky material, is given a final cure. In this instance the final product is a finger cot or prophylactic, but the principle involved of forming beads on non-tacky material may be applied to many other products.

After the cure has been completed, the finished product may be removed from the molding forms in any suitable manner. With the apparatus shown, this is accomplished by passing the molding froms with the cured products thereon under a second pair of conventional angularly arranged rotating brushes 82, which roll the product off the molding forms in the usual manner and into hoppers 83 where the products are collected.

The conveyor chain with the molding forms then passes around its drive sprocket (not shown) and after completing its lower run passes around sprocket 65 to start another cycle. During the lower run of the chain, it is desirable to maintain the molding forms in horizontal position and to this end a main beam similar to the beam 23 may be utilized, with a guide bar similar to bar 40, and with tracks similar to tracks 44 and 46 being carried thereby. Also, the chain during its lower run may engage idler sprocket 68, but this is not necessary.

As the lower run of the chain approaches sprocket 65, the molding forms are successively engaged by spaced pairs of hooks 84 carried on opposite sides of sprocket 65, which hooks assist in maintaining the molding forms in horizontal position during their travel around sprocket 65 until the molding forms engage the front ends of tracks 44 and 46, and are supported by the latter as previously explained. Each pair of hooks 84 is formed at the ends of a rod 85 mounted for limiting turning movement, which rod passes through the sprocket 65 inwardly of the sprocket teeth, as indicated in Fig. 14, and these rods are held against longitudinal movement by split holding rings 86, similar to rings 62, which extend partially into grooves formed on rod 85 adjacent opposite sides of the sprocket 65. Rings 86 hold the rods 85 against longitudinal displacement without interfering with the limited turning provided for these rods.

Surrounding each rod 85 adjacent one side of sprocket 65 is a coil spring 87, one end of which is secured to the rod while the opposite end is secured to the sprocket, and adjacent the opposite side of the sprocket, the rod is provided with a stop arm 88 that is adapted to contact a stop pin 89 mounted in the sprocket. Thus, each spring 87 has a normal tendency to turn its associated rod back to normal position with arm 88 against pin 89 whenever the rod is turned in the opposite direction, as will be understood. At the outer end of each hook 84, an inclined extension 90 is provided, which is adapted to engage a fixed cam rod 91 suitably supported from overhead supports (not shown) in the path of travel of extensions 90. The cam rod 91 is arranged just above the starting point of tracks 44 and 46, so that as each pair of molding forms approach tracks 44 and 46, the inclined extensions 90 on the hooks will engage the cam surface on rod 91, causing the hooks and rod 85 to turn against the action of spring 87. As the hooks are turned, the molding forms will pass off the hooks and onto tracks 44 and 46, and after the ends of extensions 90 pass beyond the cam rod 91, springs 87 will return the hooks and rod 85 to normal position ready to engage another pair of molding forms as they reach the end of their lower run. The drive sprocket, which is not shown, for the conveyor chain may have hooks similar to the hooks 84, which would be reversed in position so as to lower the molding forms in horizontal position as they move from the end of their upper run to the start of their lower run, or any other suitable means may be provided for maintaining the molding form in horizontal position as they pass around the drive sprocket.

In using dispersions of some kinds of plastic materials which are non-tacky after drying, it may be found that such materials do not adhere to the inner and outer sleeves of tacky material sufficiently well to permit a satisfactory bead to be rolled on the product being produced. When such materials are encountered I provide an alternate method of securing the non-tacky material between the sleeves, which in effect, locks the two sleeves to the non-tacky material so that a satisfactory bead may readily be rolled.

In Fig. 2 I have shown supports 92 which carry, on each side of the chain conveyor, a perforating device 93 in the form of small vertical spikes or the like, one of which devices is arranged in the path of travel of that portion of each film coating 74 that overlaps the first sleeve 66 on each of the molding forms. When the alternate method is used, the perforating devices 93 will be located in the apparatus so that each film coating 74 will pass over the spikes and be perforated throughout that portion of the coating which overlaps sleeve 66, just before the molding forms reach the second sleeve applying unit 76. Then, as the second sleeve 77 is formed on each molding form, some of the material of this second sleeve will pass through the perforations in coating 74, so that after drying, sleeve 77 will be additionally secured to sleeve 66 and to coating 74 by means of the material from sleeve 77 which now fills the perforations. This arrangement is more clearly shown in Figs. 10 and 11, wherein the tacky material 94 fills the perforations in coating 74 and connects the sleeves 66 and 77 together, so that these sleeves are, in effect, locked to and through the coating 74. With this alternate arrangement the beads may readily be rolled as previously described.

It is to be understood that while one type of apparatus has been shown for carrying out my method, other types may readily be used. Also, the method may be readily carried out by hand, since one of the molding forms may be rotated manually over one of the belts 38 or 38' until a latex sleeve 66 of suitable thickness is formed thereon, then the molding form may be dipped by hand into the bath 73 until a suitable coating 74 of non-tacky material is formed thereon overlapping a portion of sleeve 66, then the molding form again may be rotated manually over one of the belts 38 or 38' until the second latex sleeve 77 is formed thereon, after which the molding form with the materials thereon may be moved by hand into engagement with a rotating brush or the like, which will roll the sleeves and the enclosed portion of the non-tacky coating into bead form so that the final product may be vulcanized with a satisfactory bead rolled thereon. In carrying out my alternate method by hand, the molding form with sleeve 66 and coating 74 thereon may be manually rotated over one of the perforating devices 93 until the coating 74 is satisfactorily perforated.

It is also possible to form a bead on non-tacky articles made from the appendix of sheep and other animals, such as prophylactics and the like, by enclosing the open sleeve end of such articles between inner and outer sleeves of latex or equivalent tacky material, and then rolling the three sleeves together to form a bead as explained herein.

While I have shown and described the preferred manner of carrying out my method, it will be obvious that the invention is not limited thereto and that modifications and changes may be made therein without departing from the spirit of the invention or from the scope of the subjoined claims.

What is claimed is:

1. A method for forming a bead on non-tacky plastic material which comprises forming a sleeve of such material, enclosing a portion of said sleeve with inner and outer sleeves of tacky material, and then rolling all of said sleeves upon themselves to form a bead.

2. A method for forming a bead on non-tacky plastic film material which comprises forming a sleeve of such material, securing a portion of said sleeve between inner and outer sleeves of tacky material, and then rolling all of said sleeves upon themselves to form a bead.

3. A method for forming a bead on non-tacky plastic film material which comprises forming a sleeve of such material, securing a portion of said sleeve between inner and outer sleeves of tacky material by interlocking said inner and outer sleeves through said first-named sleeve, and then rolling all of said sleeves upon themselves to form a bead.

4. A method for forming a bead on plastic film material that is non-tacky after drying which comprises forming a sleeve of such material, enclosing one end portion of said sleeve between a pair of substantially co-extensive sleeves of tacky film material, and then rolling all of said sleeves upon themselves to form a bead.

5. A method for forming a head on non-tacky plastic film material which comprises forming a sleeve of tacky material on a molding form, then forming an article of said non-tacky material on said form with a sleeve that covers part of said first sleeve, then forming a second sleeve of tacky material overlapping said sleeve of non-tacky material and substantially co-extensive with said first sleeve, and thereafter rolling all of said sleeves upon themselves to form a bead.

6. A method for forming a bead on vulcanizable plastic film material that is non-tacky after drying which comprises forming a sleeve of tacky vulcanizable film material on a molding form, then forming an article of said non-tacky material on said form with a sleeve that terminates intermediate the ends of said first sleeve, then forming a second sleeve of tacky vulcanizable film material overlapping said sleeve of non-tacky material and substantially co-extensive with said first sleeve, then rolling all of said sleeves upon themselves to form a bead on said article, and thereafter vulcanizing said article.

7. A method for forming a bead on the open end of an article made of plastic film material that is non-tacky after drying which comprises enclosing a portion of the article from its open end inwardly between a pair of sleeves of tacky film material, and then rolling said sleeves and the enclosed portion of said article inwardly upon themselves to form a bead.

8. A method for forming a bead on the open end of an article made of vulcanizable plastic film material that is non-tacky after drying which comprises securing a portion of the article from its open end inwardly between inner and outer sleeves of tacky vulcanizable film material, then rolling said sleeves and the secured portion of said article inwardly upon themselves to form a bead, and thereafter vulcanizing said article.

9. A method for forming a bead on the open end of an article made of vulcanizable plastic film material that is non-tacky after drying which comprises securing a portion of the article from its open end inwardly between inner and outer sleeves of tracky vulcanizable film material by interlocking said sleeves through said portion of the article, then rolling said sleeves and the secured portion of said article inwardly upon themselves to form a bead, and thereafter vulcanizing said article.

10. A method for forming a bead on non-tacky plastic film material which comprises forming a sleeve of tacky material on a molding form, then forming an article of said non-tacky material on said form with a sleeve that covers part of said first sleeve, perforating said sleeve of non-tacky material, then forming a second sleeve of tacky material overlapping said sleeve of non-tacky material and substantially co-extensive with said first sleeve, with the sleeves of tacky material being joined to each other through the perforations in said sleeve of non-tacky material, and thereafter rolling all of said sleeves upon themselves to form a bead.

11. An open-ended article formed of plastic film material that is non-tacky after drying having sleeves of tacky film material enclosing said open end and rolled into a permanent bead on the article.

12. An open-ended article formed of plastic film material that is non-tacky after drying having sleeves of tacky film material enclosing and extending through a part of the article adjacent its open end, which sleeves together with the enclosed portion of said article are rolled into a permanent bead for the article.

13. An open-ended finger cot formed of plastic film material that is non-tacky after drying having sleeves of tacky film material enclosing a part of the finger cot adjacent its open end, which sleeves together with the enclosed portion of said finger cot are rolled into a permanent bead for the finger cot.

14. An open-ended prophylatic formed of plastic film material than is non-tacky after drying having sleeves of tacky film material enclosing a part of the prophylactic adjacent its open end, which sleeves together with the enclosed portion of said prophylactic are rolled into a permanent bead for the prophylactic.

15. A method of forming a bead on open-ended finger cots and prophylactics formed of vulcanizable plastic film material that is non-tacky after drying which comprises enclosing a portion of the open end of such articles between sleeves of tacky vulcanizable film material, then rolling said sleeves and the enclosed portion of such articles inwardly upon themselves to form a bead, and then vulcanizing the articles.

16. A method of forming a bead on an open-ended finger cots and prophylactics formed of plastic film material that is non-tacky after drying which comprises securing a portion of such articles adjacent their open ends between inner and outer sleeves of tacky film material with portions of said sleeves extending through said portion of such articles, and then rolling said sleeves and the secured portion of such articles inwardly upon themselves to form a bead.

References Cited in the file of this patent

UNITED STATES PATENTS

| 140,472 | Collins | July 1873 |
| 2,371,883 | Gammeter | Mar. 20, 1945 |
| 2,438,901 | Coxe | Apr. 16, 1948 |
| 2,566,025 | Hauser | Aug. 28, 1951 |
| 2,586,674 | Lonne | Feb. 19, 1952 |
| 2,604,092 | Brown | July 22, 1952 |